Sept. 25, 1962 R. L. LEWIS, JR 3,055,135
FISHING POLE HOLDER AND ACTUATOR
Filed May 19, 1961 2 Sheets-Sheet 1

INVENTOR.
ROY   L.   LEWIS, JR.
BY

McMorrow, Berman + Davidson
ATTORNEYS.

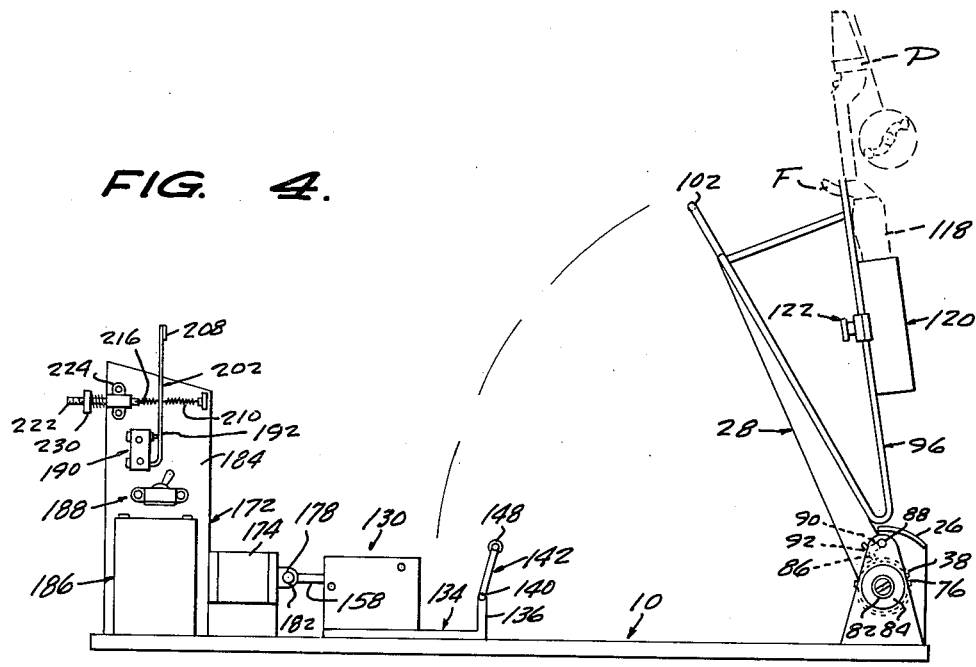
FIG. 4.
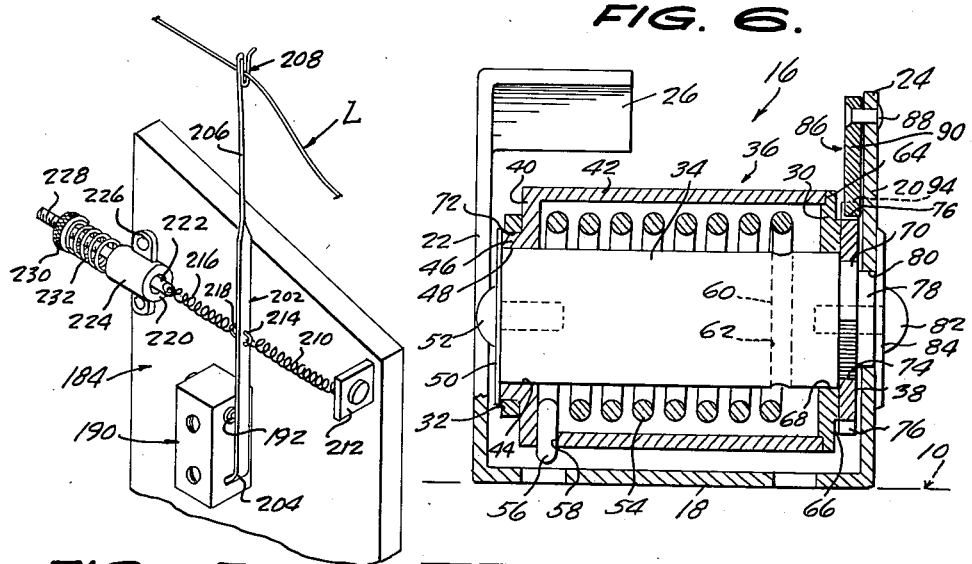
FIG. 5.
FIG. 6.
INVENTOR.
ROY L. LEWIS, JR.
BY
McMorrow, Berman & Davidson
ATTORNEYS.

United States Patent Office 3,055,135
Patented Sept. 25, 1962

3,055,135
FISHING POLE HOLDER AND ACTUATOR
Roy L. Lewis, Jr., R.R. 1, Box 42, Humboldt, Kans.
Filed May 19, 1961, Ser. No. 111,308
10 Claims. (Cl. 43—15)

This invention relates to a novel holder and actuator for fishing poles or rods, which has spring-operated, electrically released, actuating means for actuating a fishing pole or rod from a substantially horizontal fishing position to a substantially vertical hook-setting position, upon the exertion of a pull of predetermined strength upon the line of the pole or rod.

The primary object of the invention is the provision of a more practical and efficient device of the kind indicated, suitable for both boat and bank fishing, which relieves the fisherman of the need to hold a rod or pole for sustained periods, while fishing, and which eliminates losses of hooked fish where proficiency in manipulating a rod or pole for setting the hook thereof is wanting due to inexperience or physical handicap.

Another object of the invention is the provision of a mechanically and structurally superior device of the character indicated above, which involves actuating spring means which is adjustable to accommodate different fishing conditions and weights and lengths of poles or rods, and wherein the electrical release means is adjustable to predetermine its response to different strengths of pull exerted on a fishing line by fish, so that, for example, hooking of small or undersized fish can be provided against.

Other important objects and advantageous features of the invention will be apparent from the following description and the accompanying drawings, wherein, for purposes of illustration only, a specific form of the invention is set forth in detail.

In the drawings:

FIGURE 4 is a side elevation of the device, showing the same in operated position and carrying a fishing rod in phantom lines;

FIGURE 5 is an enlarged fragmentary perspective view of the mounting carrying the micro switch assembly and its adjustable setting means; and, FIGURE 6 is an enlarged transverse vertical section taken on the line 6—6 of FIGURE 1.

Figure 1:
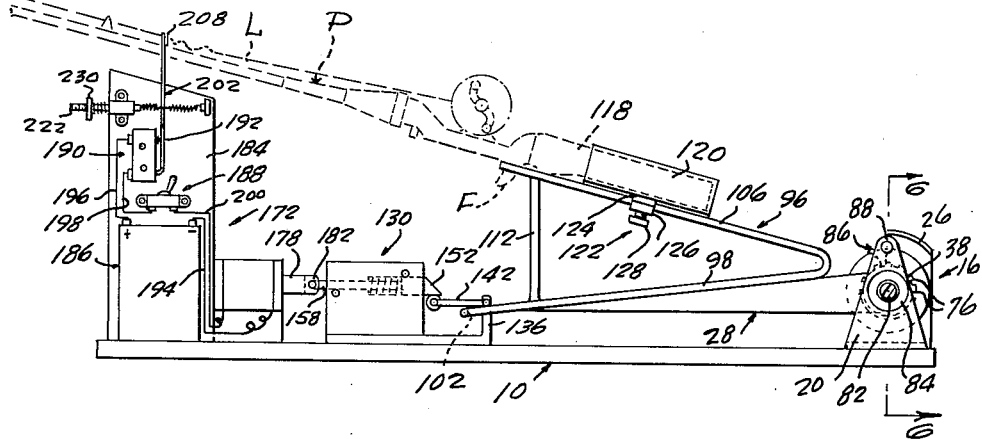
FIGURE 1 is a side elevation of a device of the present invention, showing the same in set or cocked position, and holding a fishing rod in phantom lines.
Figure 2:
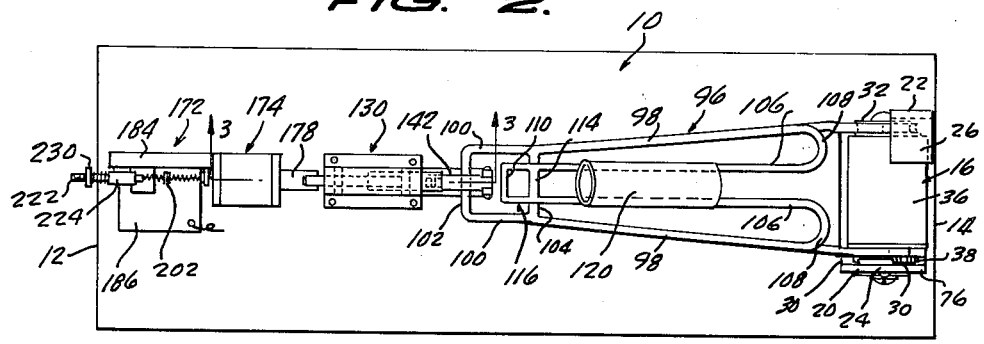
FIGURE 2 is a top plan view of the device of FIGURE 1.

Referring in detail to the drawings, wherein like numerals designate like parts throughout the several views, the illustrated device comprises a support shown as an elongated flat base plate 10 having a forward end 12 and a rear end 14. Fixed upon the base plate 10, at the rear end thereof, is a spring-operated assembly 16 which comprises a U-shaped bracket having a bight portion 18 suitably fixed centrally upon the base plate crosswise thereof, and upstanding arms 20 and 22. The arm 20, as seen in FIGURES 1 and 4, is preferably of isosceles triangular shape and has an apex 24, at its upper end. The arm 22 is preferably parallel sided and is upwardly and rearwardly angled, relative to the perpendicular and relative to the vertical centerline of the arm 20, and extends rearwardly beyond the arm 20. The arm 22 has, on its upper end, slightly above the apex 24 of the arm 20, a laterally inwardly extending stop lug 26, which, as shown, is preferably arcuate in cross section.

A forwardly tapered channel lever arm 28 has pendant side flanges, which have rearwardly etxending portions 30 and 32 which are positioned between and close to the bracket arms 20 and 22, as shown in FIGURE 6. A relatively stationary stub shaft 34 is mounted on and extends laterally inwardly from the bracket arm 20. A cylindrical casing 36 spacedly surrounds the stub shaft 34 and has an annular end wall 40. The end wall 40 is integral with the adjacent end of the sidewall 42 of the casing 36 and has a central bearing opening 44 which is surrounded by an external lateral squared flange 46 having a bearing opening 48, in which bearing openings the adjacent end of the stub shaft 34 is journalled. A washer 50, larger in diameter than the stub shaft is secured to the related end of the stub shaft, as by means of a screw 52, and bears against the outer end of the annular flange 46.

A heavy coil operating spring 54 surrounds the stub shaft 34, in the space between the stub shaft and the casing sidewall 42, and has, at the end thereof adjacent to the casing end wall 40, a lateral arm 56, which is securably engaged through an opening 58, provided in the casing sidewall 42. At its other end, the spring 54 has a diametrical terminal 60 which is securably engaged in a diametrical bore 62, provided in the stub shaft 34.

The lever arm portion 30 is separably engaged with the adjacent end of the casing sidewall 42, which it receives in an annular seat 64. The lever arm portion 30 has a narrow annular spacing boss 66 on its outer side, and a central bearing opening 68, extending through the portion 30 and the boss 66 journals the adjacent end of the stub shaft 34, which has thereon a reduced diameter axial polygonal boss 70.

The portion 32 of the lever arm 28 has a squared opening 72 which is engaged on the squared flange 46 of the casing end wall 40. A toothed wheel 38 has a squared opening 74 which conformably receives the polygonal boss 70, the wheel 38 being provided with detent notches 76 extending therearound.

The stub shaft 34 has a reduced diameter axial cylindrical terminal 78, extending outwardly beyond the polygonal boss 70, which is engaged in an opening 80, provided centrally in the bracket arm 20, at a location spaced downwardly from its apex 34, and centered relative to the curvature of the stop lug 26. The stub shaft 34 is secured in place on the bracket arm 20, as by means of a screw 82, extending through a washer 84, engaged with the outer side of the arm 20, and threaded into the terminal 78. The tension of the actual arm spring 54 can be adjusted by rotating the toothed wheel 38, relative to the bracket arms 20 and 22 with the dog 86 retracted, by means of a suitable spanner wrench (not shown).

At a location spaced above the casing 36 and on the vertical centerline of the bracket arm 20, a detent dog 86 is pivoted on the arm 20, as indicated at 88. The dog 86 is T-shaped and has a standard portion 90 and a crosshead having an upstanding arm 92 and a downwardly extending arm 94, the lower arm 94 being shown engaged in a notch 76 of the lever arm portion 30, in FIGURE 1, for holding the spring 54 under tension imposed thereon by swinging the lever arm 28 downwardly and forwardly from an elevated operated position to a depressed set or cocked position. The dog pivot 88 is on the standard portion 90, at the free end thereof, so that the crosshead of the dog overbalances the dog 86 toward the notches 76. As shown in FIGURE 4, the lever arm 28 is stopped, at the end of its operating swing, by engagement of the portion 32 of the arm with the forward edge of the stop lug 26.

Mounted upon and extending along the lever arm 28 is a fishing rod or pole holding frame 96, having limited resilience for absorbing some of the shock produced when the arm 28 strikes the stop lug 26. The frame 96 comprises outer longitudinal, forwardly converging lower bars 98 which have short parallel portions 100, on their forward ends. The bars 98 are suitably fixed upon the top of the lever arm 28, along the sides thereof. A forward cross bar 102 extends between the forward ends of the portions 100, and a rear cross bar 104 extends between the rear ends of the portions 100. The frame 96 further comprises inner longitudinal parallel spaced upper bars 106, which are shorter than and are disposed centrally between the lower bars and are joined, at their rear ends, to the rear ends of the lower bars 98, by arcuate portions 108.

The upper or inner bars 106, as shown in FIGURES 1 and 4, are disposed at acute forward and upward angles relative to the lower bars 98 and are connected together, at their forward ends, by a forward cross bar 110, and a vertical spreader bar 112, extends upwardly from the rear cross bar 104 of the lower bars 98 and is fixed, at its upper end, to a rear cross bar 114 extending between the upper bars 106, at a location spaced rearwardly from the forward cross bar 110. The portions of the upper bars 106 between the cross bars 110 and 114 and these cross bars constitute a rectangular receiver 116 for the finger-piece F of a fishing rod or pole P, having a butt 118 extending rearwardly from the finger-piece.

An elongated socket 120 is positioned between and bears slidably and adjustably upon the tops of the upper bars 106, at a location spaced rearwardly from the receiver 116, for receiving the butt 118. A clamp 122 comprises an upper transverse member 124 which is fixed to the underside of the socket 120 and bears upon the tops of the rods 106, and a lower transverse member 126, which bears against the undersides of the rods 106, and a clamping screw 128, which extends upwardly through the lower member 126 and is threaded in the upper member 124, for clamping the bars 106 therebetween and holding longitudinal adjustments of the socket 120, relative to the frame 96, for accommodating butts 118 of different lengths.

Figure 3:
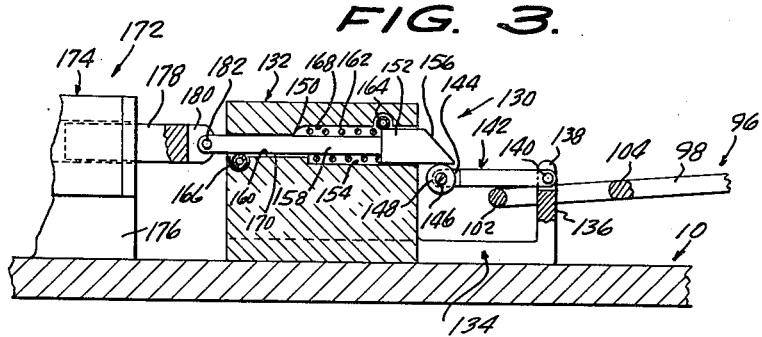
FIGURE 3 is an enlarged fragmentary vertical longitudinal section taken on the line 3—3 of FIGURE 2.

The forward cross bar 102 of the lower bars 98 of the frame 96 serves as a detent bar relative to a releasably retaining assembly 130, which comprises a longitudinally elongated relatively narrow block 132 which is suitably fixed upon the base plate 10, at a location spaced forwardly from the rod holding frame 96, in the depressed, set position of the lever arm 28, and spaced rearwardly from the forward end 12 of the base plate 10. A reclining L-shaped bracket 134 extends rearwardly from the block 132 and has an upright or post having a pair of spaced ears 138, on its upper end, through which extends a pivot pin 140. A retaining lever 142 is pivoted, at one end, on the pin 140, between the ears 138, and has spaced ears 144, on its free end, between which is journalled, at 146, an anti-friction roller 148. As shown in FIGURE 3, the upstanding portion 136 is positioned, so that, in the depressed position of the lever arm 28, the portion 136 extends upwardly behind the detent cross bar 102, and the retaining lever 142 is adapted to be swung forwardly and over the detent cross bar 102, for holding the actuating arm in its depressed set position, against the resistance of the operating spring 54.

For releasably holding the retaining lever 142 in its retaining position, a longitudinally and horizontally movable bolt 150 is provided, which comprises a rectangular cross section head 152 which slides endwise in a rectangular longitudinal horizontal blind bore 154 which is formed in the block 132 and opens to the rear end of the block. The rear end of the bolt head 152 is beveled to provide a cam surface 156, with which the roller 148 on the retaining lever 142 is adapted to be engaged, in a manner hereinafter set forth. The bolt 150 further comprises a reduced diameter shank 158 which extends forwardly from the head 152 and slides through a horizontal bore 160. The bore 160 opens to and extends from the blind bore 154 to the forward end of the block 132. A coil spring 162 is circumposed on the shank 158 and is compressed between the bolt head 152 and the inner end of the blind bore 154, and urges the bolt head rearwardly toward its rearward retaining position, shown in FIGURE 3. For reducing friction in the operation of the bolt 150, anti-friction rollers 164 and 166 are inset in the top wall 168 of the blind bore 154, and in the bottom wall 170 of the bore 160, respectively.

Fixedly mounted on the base plate 10 and spaced forwardly from the block 132 is an electrical bolt releasing assembly 172 which comprises a horizontal solenoid 174, disposed in line with the bolt shank 158, and supported above the base plate, as indicated at 176. The solenoid 174 has a rearwardly extending core 178 having spaced ears 180, on its rear end, between which the forward end of the bolt shank 158 is pivoted, as indicated at 182.

The assembly 172 further comprises an upstanding support plate 184 which is offset to one side of the axis of the solenoid 174, and rises thereabove. An electric battery 186 is supported on the base plate 10, at the other side of the support plate 184, with an "on" and "off" switch 188 on the plate 184 above the battery. On the same side of the plate 184 a suitable switch, such as a micro-switch 190 is mounted, above the switch 188, which has a rearwardly extending actuator 192. As shown in FIGURE 1, one terminal of the battery 186 is connected by a wire 194 to one side of the solenoid 174, and its other terminal is connected by a wire 196 to one side of the switch 190. The other side of the switch 190 is connected by a wire 198 to one side of the switch 188, whose other side is connected by a wire 200 to the remaining side of the solenoid 174.

As shown in detail in FIGURE 5, an upstanding vertical actuator arm 202 is flexibly fixed, at its lower end, as indicated at 204, to the side of the switch 190, at a location spaced below and in line with the actuator 192. The actuator arm 202 has a reduced diameter extension 206, rising from its upper end above the support plate 184, and terminating, at its upper end, in a flexible and resilient U-shaped seat 208, in which a fishing line L leading from a fishing rod is adapted to be jammed, so as to be frictionally connected to the actuator arm 202, and able to pull through or out of the seat 208, only when the lever arm 28 has been operated upwardly and rearwardly to its upstanding operated position.

The actuator arm 202 is sensitively and adjustably balanced, out of contact with the switch actuator 192, by means of a first coil spring 210, which is stretched between a lug 212 located at the rear edge of the plate 184, and an eye 214 on an intermediate part of the actuator arm; and by a second coil spring 216, which is stretched between an eye 218, in line with and on the opposite side of the actuator arm from the eye 214, and an eye 220 on the rear end of an adjusting rod 222.

The adjusting rod 222 works through a sleeve 224 which is fixed, as indicated at 226, to the support plate 184, in line with the lug 212. The rod 222 has a threaded forward end portion 228, on which is threaded a knurled adjusting nut 230, and a coil spring 232, larger and heavier than either of the springs 210 and 216, is circumposed on the rod 222 and is compressed between the sleeve 224 and the adjusting nut 230. By adjusting the nut 230 along the rod 222, in one direction, the spring 232 can be relaxed so that the springs 210 and 216 balance each other and center the actuator arm 202 at its maximum distance away from the switch actuator 192, so that a heavy pull on the fishing line L is required to move the actuator arm 202 forwardly far enough to engage and push the actuator 192, for closing the switch 190 and actuating the solenoid 174, so as to retract the bolt head 152 off the roller 148 of the retaining lever 142 and free the lever arm operating spring 54 to swing the lever arm 28 upwardly from its depressed set position and tighten and pull the fishing line L, so as to set the hook thereof in a fish pulling on the line. Adjusting the nut 230 in the opposite direction along the rod 222 serves to compress the spring 232, so that the resultant increased tensioning of the springs 216 and 232 overcomes the tension of the spring 210, whereby the actuator arm 202 is positioned closer to the switch actuator 192, whereby a weaker pull on the fishing line L is sufficient to actuate the solenoid 174, in the manner outlined above, and release the lever arm 28.

The lever arm 28 is reset, from an operated position, simply by forcing the same forwardly and downwardly, against the resistance of the spring 54, until the upright 136 is positioned behind the detent cross bar 102, and then swinging the retaining lever 142 forwardly and downwardly, so that its roller 148 forcibly engages the cam surface 156 of the bolt head 152 and displaces the bolt head far enough forwardly against the resistance of the spring 162, to enable the roller 148 to engage beneath the bolt head, whereat the bolt head is projected by the spring 162 to retaining engagement with the top of the roller 148.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A fishing pole holder and actuator comprising a horizontal support, a lever arm extending along and pivoted at one end on the support, spring means biasing the lever arm upwardly away from the support, means for stopping the lever arm in its elevated position, fishing pole holding means on said lever arm, detent means on the other end of the lever arm, a retaining assembly fixed on said support and having retaining means including a movable bolt for engagement with said detent means for retaining the lever arm in a depressed position, and a releasing assembly fixed on said support and operatively connected to said bolt, said releasing assembly having a flexible actuator arm having means for connection to a fishing line leading from a fishing pole engaged in said pole holding means, said releasing assembly comprising a solenoid having a movable core operatively connected to said bolt, and switch means having an actuator for operative engagement by said actuator arm when a fishing line connected to the actuator arm is pulled by a fish, and an electric source connected to said switch means and solenoid.

2. A fishing pole holder and actuator comprising a horizontal support, a lever arm extending along and pivoted at one end on the support, spring means biasing the lever arm upwardly away from the support, means for stopping the lever arm in its elevated position, fishing pole holding means on said lever arm, detent means on the other end of the lever arm, a retaining assembly fixed on said support and having retaining means including a movable bolt for engagement with said detent means for retaining the lever arm in a depressed position, and a releasing assembly fixed on said support and operatively connected to said bolt, said releasing assembly having a flexible actuator arm having means for connection to a fishing line leading from a fishing pole engaged in said pole holding means, said releasing assembly comprising a solenoid having a movable core operatively connected to said bolt, and switch means having an actuator for operative engagement by said actuator arm when a fishing line connected to the actuator arm is pulled by a fish, and a battery mounted on said support and severally connected to the switch and the solenoid, whereby when the actuator arm is so pulled the solenoid will operate to move the bolt and thereby release the lever arm.

3. A fishing pole holder and actuator comprising a normally horizontal base plate having forward and rear ends, a spring assembly mounted upon the base plate at its rear end, said assembly comprising a U-shaped bracket having laterally spaced upstanding first and second arms, a stub shaft fixed to and extending laterally inwardly from said first arm, a lever arm journalled at its rear end on said stub shaft and extending forwardly therefrom, said second bracket arm having stop means with which the lever arm is engageable in an elevated operated position of the lever arm, spring means connected to the stub shaft and said lever arm and biasing said lever arm from a depressed set position to an elevated position, a fishing pole holding means on said lever arm, a detent element on the forward end of the lever arm, and a retaining assembly fixed on the base and having retaining means adapted to be engaged over said detent element only in the depressed position of the lever arm, and a fishing line operated releasing assembly mounted on the base, and having a movable element operatively connected to said retaining means, said detent element comprising a cross bar, said retaining assembly comprising a block fixed upon and upstanding from the base plate, a rearwardly spring-pressed bolt mounted on the block, said bolt having a head on its rear end, a bracket extending rearwardly from the block, said bracket having an upright adapted to occupy a position behind said cross bar in the set position of the lever arm, a retaining lever pivoted at one end to said upright and having a free end, said retaining lever being adapted to retainably overlie said cross bar in the set position of the lever arm with its free end engaged beneath said bolt head, the movable element of the releasing assembly being operatively connected to said bolt, whereby a pull by a fish on the line will move the movable element and the bolt and thereby release the lever arm.

4. A fishing pole holder and actuator comprising a normally horizontal base plate having forward and rear ends, a spring assembly mounted upon the base plate at its rear end, said assembly comprising a U-shaped bracket having laterally spaced upstanding first and second arms, a stub shaft fixed to and extending laterally inwardly from said first arm, a lever arm journalled at its rear end on said stub shaft and extending forwardly therefrom, said second bracket arm having stop means with which the lever arm is engageable in an elevated operated position of the lever arm, spring means connected to the stub shaft and said lever arm and biasing said lever arm from a depressed set position to an elevated position, a fishing pole holding means on said lever arm, a detent element on the forward end of the lever arm, and a retaining assembly fixed on the base and having retaining means adapted to be engaged over said detent element only in the depressed position of the lever arm, and a fishing line operated releasing assembly mounted on the base, and having a movable element operatively connected to said retaining means, said detent element comprising a cross bar, said retaining assembly comprising a block fixed upon and upstanding from the base plate, a rearwardly spring-pressed bolt mounted on the block, said bolt having a head on its rear end, a bracket extending rearwardly from the block, said bracket having an upright adapted to occupy a position behind said cross bar in the set position of the lever arm, a retaining lever pivoted at one end to said upright and having a free end, said retaining lever being adapted to retainably overlie said cross bar in the set position of the lever arm with its free end engaged beneath said bolt head, the movable element of the releasing assembly being operatively connected to said bolt, said releasing assembly comprising a solenoid having a rearwardly extending core constituting said movable element, an upstanding flexible actuator arm having a fishing line seat on its upper end, and a switch having an actuator adapted to be engaged and moved, by the actuator arm to close the switch only when pull is exerted on a fishing line by a fish, and an electric source connected to said switch and solenoid, whereby when the switch is closed the movable element and the bolt will be moved and thereby release the lever arm.

5. A fishing pole holder and actuator comprising a normally horizontal base plate having forward and rear ends, a spring assembly mounted upon the base plate at its rear end, said assembly comprising a U-shaped bracket having laterally spaced upstanding first and second arms, a stub shaft fixed to and extending laterally inwardly from said first arm, a lever arm journalled at its rear end on said stub shaft and extending forwardly therefrom, said second bracket arm having stop means with which the lever arm is engageable in an elevated operated position of the lever arm, spring means connected to the stub shaft and said lever arm and biasing said lever arm from a depressed set position to an elevated position, a fishing pole holding means on said lever arm, a detent element on the forward end of the lever arm, and a retaining assembly fixed on the base and having retaining means adapted to be engaged over said detent element only in the depressed position of the lever arm, and a fishing line operated releasing assembly mounted on the base, and having a movable element operatively connected to said retaining means, said detent element comprising a cross bar, said retaining assembly comprising a block fixed upon and upstanding from the base plate, a rearwardly spring-pressed bolt mounted on the block, said bolt having a head on its rear end, a bracket extending rearwardly from the block, said bracket having an upright adapted to occupy a position behind said cross bar in the set position of the lever arm, a retaining lever pivoted at one end to said upright and having a free end, said retaining lever being adapted to retainably overlie said cross bar in the set position of the lever arm with its free end engaged beneath said bolt head, the movable element of the releasing assembly comprising a solenoid having a rearwardly extending core constituting said movable element, an upstanding flexible actuator arm having a fishing line seat on its upper end, and a switch having an actuator adapted to be engaged and moved, by the actuator arm to close the switch only when pull is exerted on a fishing line by a fish, said releasing assembly further comprising an upstanding support plate fixed on the base plate and carrying said switch, and balancing spring means connected to the support plate and the actuator arm and normally positioning the actuator arm at a maximum predetermined distance from the switch actuator, and an electric source connected to said switch and solenoid, whereby when the switch is closed the movable element and the bolt will be moved and thereby release the lever arm.

6. A fishing pole holder and actuator comprising a normally horizontal base plate having forward and rear ends, a spring assembly mounted upon the base plate at its rear end, said assembly comprising a U-shaped bracket having laterally spaced upstanding first and second arms, a stub shaft fixed to and extending laterally inwardly from said first arm, a lever arm journalled at its rear end on said stub shaft and extending forwardly therefrom, said second bracket arm having stop means with which the lever arm is engageable in an elevated operated position of the lever arm, spring means connected to the stub shaft and said lever arm and biasing said lever arm from a depressed set position to an elevated position, a fishing pole holding means on said lever arm, a detent element on the forward end of the lever arm, and a retaining assembly fixed on the base and having retaining means adapted to be engaged over said detent element only in the depressed positon of the lever arm, and a fishing line operated releasing assembly mounted on the base, and having a movable element operatively connected to said retaining means, said detent element comprising a cross bar, said retaining assembly comprising a block fixed upon and upstanding from the base plate, a rearwardly spring-pressed bolt mounted on the block, said bolt having a head on its rear end, a bracket extending rearwardly from the block, said bracket having an upright adapted to occupy a position behind said cross bar in the set position of the lever arm, a retaining lever pivoted at one end to said upright and having a free end, said retaining lever being adapted to retainably overlie said cross bar in the set position of the lever arm with its free end engaged beneath said bolt head, the movable element of the releasing assembly comprising a solenoid having a rearwardly extending core constituting said movable element, an upstanding flexible actuator arm having a fishing line seat on its upper end, and a switch having an actuator adapted to be engaged and moved, by the actuator arm to close the switch only when pull is exerted on a fishing line by a fish, said releasing assembly further comprising an upstanding support plate fixed on the base plate and carrying said switch, and balancing spring means connected to the support plate and the actuator arm and normally positioning the actuator arm at a maximum predetermined distance from the switch actuator, said balancing means comprising a first spring stretched between the actuator arm and a rear part of the support plate, a second spring stretched between the actuator arm and a forward part of the support plate, and an electric source connected to said switch and solenoid, whereby when the switch is closed the movable element and the bolt will be moved and thereby release the lever arm.

7. A fishing pole holder and actuator comprising a normally horizontal base plate having forward and rear ends, a spring assembly mounted upon the base plate at its rear end, said assembly comprising a U-shaped bracket having laterally spaced upstanding first and second arms, a stub shaft fixed to and extending laterally inwardly from said first arm, a lever arm journalled at its rear end on said stub shaft and extending forwardly therefrom, said second bracket arm having stop means with which the lever arm is engageable in an elevated operated position of the lever arm, spring means connected to the stub shaft and said lever arm and biasing said lever arm from a depressed set position to an elevated position, a fishing pole holding means on said lever arm, a detent element on the forward end of the lever arm, and a retaining assembly fixed on the base and having retaining means adapted to be engaged over said detent element only in the depressed position of the lever arm, and a fishing line operated releasing assembly mounted on the base, and having a movable element operatively connected to said retaining means, said detent element comprising a cross bar, said retaining assembly comprising a block fixed upon and upstanding from the base plate, a rearwardly spring-pressed bolt mounted on the block, said bolt having a head on its rear end, a bracket extending rearwardly from the block, said bracket having an upright adapted to occupy a position behind said cross bar in the set position of the lever arm, a retaining lever pivoted at one end to said upright and having a free end, said retaining lever being adapted to retainably overlie said cross bar in the set position of the lever arm with its free end engaged beneath said bolt head, the movable element of the releasing assembly comprising a solenoid having a rearwardly extending core constituting said movable element, an upstanding flexible actuator arm having a fishing line seat on its upper end, and a switch having an actuator adapted to be engaged and moved, by the actuator arm to close the switch only when pull is exerted on a fishing line by a fish, said releasing assembly further comprising an upstanding support plate fixed on the base plate and carrying said switch, and balancing spring means connected to the support plate and the actuator arm and normally positioning the actuator arm at a maximum predetermined distance from the switch actuator, said balancing means comprising a first spring stretched between the actuator arm and a rear part of the support plate, a second spring stretched between the actuator arm and a forward part of the support plate, an adjusting rod, a sleeve fixed to the support plate through which said rod works, said rod having a rear end to which said second spring is connected, said rod having a threaded forward end portion having a tension adjusting nut threaded thereon, and a third spring compressed between the nut and the sleeve, and an electric source connected to said switch and solenoid, whereby when the switch is closed the movable element and the bolt will be moved and thereby release the lever arm.

8. A fishing pole holder and actuator comprising a normally horizontal base plate having forward and rear ends, a spring assembly mounted upon the base plate at its rear end, said assembly comprising a U-shaped bracket having laterally spaced upstanding first and second arms, a stub shaft fixed to and extending laterally inwardly from said first arm, a lever arm journalled at its rear end on said stub shaft and extending forwardly therefrom, said second bracket arm having stop means with which the lever arm is engageable in an elevated operated position of the lever arm, spring means connected to the stub shaft and said lever arm and biasing said lever arm from a depressed set position to an elevated position, a fishing pole holding means on said lever arm, a detent element on the forward end of the lever arm, and a retaining assembly fixed on the base and having retaining means adapted to be engaged over said detent element only in the depressed position of the lever arm, and a fishing line operated releasing assembly mounted on the base, and having a movable element operatively connected to said retaining means, said spring assembly further comprising a casing surrounding and journalled on said stub shaft, said lever arm having laterally spaced first and second portions on its rear end, said first portion being rotatably mounted on the stub axle and said second portion being non-rotatably mounted on the casing, said spring means comprising a coil spring circumposed on the stub shaft within the casing, one end of the spring being connected to the casing and its other end to the stub shaft, whereby a pull by a fish on the line will move the movable element and the retaining means and thereby release the lever arm.

9. A fishing pole holder and actuator comprising a normally horizontal base plate having forward and rear ends, a spring assembly mounted upon the base plate at its rear end, said assembly comprising a U-shaped bracket having laterally spaced upstanding first and second arms, a stub shaft fixed to and extending laterally inwardly from said first arm, a lever arm journalled at its rear end on said stub shaft and extending forwardly therefrom, said second bracket arm having stop means with which the lever arm is engageable in an elevated operated position of the lever arm, spring means connected to the stub shaft and said lever arm and biasing said lever arm from a depressed set position to an elevated position, a fishing pole holding means on said lever arm, a detent element on the forward end of the lever arm, and a retaining assembly fixed on the base and having retaining means adapted to be engaged over said detent element only in the depressed position of the lever arm, and a fishing line operated releasing assembly mounted on the base, and having a movable element operatively connected to said retaining means, said spring assembly further comprising a casing surrounding and journalled on said stub shaft, said lever arm having laterally spaced first and second portions on its rear end, said first portion being rotatably mounted on the stub axle and said second portion being non-rotatably mounted on the casing, said spring means comprising a coil spring circumposed on the stub shaft within the casing, one end of the spring being connected to the casing and its other end to the stub shaft, and means releasably mounting the stub shaft on said first bracket arm comprising a washer engaged with the outer side of said first arm, and a screw threaded axially in the stub shaft and extending through the washer, said screw having an enlarged diameter head adapted to engage the outer side of the washer, whereby a pull by a fish on the line will move the movable element and the retaining means and thereby release the lever arm.

10. A fishing pole holder and actuator comprising a normally horizontal base plate having forward and rear ends, a spring assembly mounted upon the base plate at its rear end, said assembly comprising a U-shaped bracket having laterally spaced upstanding first and second arms, a stub shaft fixed to and extending laterally inwardly from said first arm, a lever arm journalled at its rear end on said stub shaft and extending forwardly therefrom, said second bracket arm having stop means with which the lever arm is engageable in an elevated operated position of the lever arm, spring means connected to the stub shaft and said lever arm and biasing said lever arm from a depressed set position to an elevated position, a fishing pole holding means on said lever arm, a detent element on the forward end of the lever arm, and a retaining assembly fixed on the base and having retaining means adapted to be engaged over said detent element only in the depressed position of the lever arm, and a fishing line operated releasing assembly mounted on the base, and having a movable element operatively connected to said retaining means, said spring assembly further comprising a casing surrounding and journalled on said stub shaft, said lever arm having laterally spaced first and second portions on its rear end, said first portion being rotatably mounted on the stub axle and said second portion being non-rotatably mounted on the casing, said spring means comprising a coil spring circumposed on the stub shaft within the casing, one end of the spring being connected to the casing and its other end to the stub shaft, and means releasably mounting the stub shaft on said first bracket arm comprising a washer engaged with the outer side of said first arm, and a screw threaded axially in the stub shaft and extending through the washer, said screw having an enlarged diameter head adapted to engage the outer side of the washer, a notched wheel non-rotatably mounted on said stub shaft adjacent said first bracket arm having circumferentially spaced notches, and a dog pivoted on said first bracket arm for engaging selected notches of the wheel, said dog being manually releasable from a notch of the wheel to enable manual rotation of the casing relative to the stub shaft for adjusting the tension of said coil spring, the dog being returnable to engagement with a notch of the wheel for retaining the adjustment, whereby a pull by a fish on the line will move the movable element and the retaining means and thereby release the lever arm.

References Cited in the file of this patent

UNITED STATES PATENTS

| | | |
|---|---|---|
| 1,957,853 | Sibly | May 8, 1934 |
| 2,494,800 | Finley | Jan. 17, 1950 |
| 2,657,492 | Skorr | Nov. 3, 1953 |
| 2,735,207 | Christiansen | Feb. 21, 1956 |
| 2,783,575 | Housel | Mar. 5, 1957 |
| 2,795,072 | Porter | June 11, 1957 |
| 2,811,801 | Daniel | Nov. 5, 1957 |
| 2,964,868 | Bennett | Dec. 20, 1960 |

FOREIGN PATENTS

| | | |
|---|---|---|
| 466,395 | Italy | Oct. 26, 1951 |